United States Patent [19]
Yang

[11] Patent Number: 5,669,687
[45] Date of Patent: *Sep. 23, 1997

[54] OPTICAL PROJECTION SYSTEM

[75] Inventor: Jin-Se Yang, Seoul, Rep. of Korea

[73] Assignee: Daewoo Electronics Co., Ltd., Seoul, Rep. of Korea

[*] Notice: The term of this patent shall not extend beyond the expiration date of Pat. No. 5,541,679.

[21] Appl. No.: 667,175

[22] Filed: Jun. 20, 1996

Related U.S. Application Data

[63] Continuation of Ser. No. 546,206, Oct. 20, 1995, Pat. No. 5,541,679.

[30] Foreign Application Priority Data

Oct. 31, 1994 [KR] Rep. of Korea ............... 94-28335

[51] Int. Cl.$^6$ ............................................. G03B 21/28
[52] U.S. Cl. ........................... 353/98; 353/97; 353/31; 348/771
[58] Field of Search ......................... 353/31, 34, 37, 353/97, 98, 99, 84; 348/771, 772, 764, 755

[56] References Cited

U.S. PATENT DOCUMENTS

| | | | |
|---|---|---|---|
| 5,379,081 | 1/1995 | Kim et al. | 353/99 |
| 5,486,881 | 1/1996 | Hwang | 353/34 |
| 5,504,629 | 4/1996 | Lim | 353/99 |
| 5,541,679 | 7/1996 | Yang | 353/98 |
| 5,555,041 | 9/1996 | Manabe | 353/98 |
| 5,560,697 | 10/1996 | Lim et al. | 353/99 |
| 5,564,811 | 10/1996 | Lim | 353/99 |

*Primary Examiner*—William Dowling
*Attorney, Agent, or Firm*—Pennie & Edmonds LLP

[57] ABSTRACT

An optical projection system includes a non-point white light source for emanating a white light, a source lens for focusing the white light, a source stopper having a source aperture for shaping the white light into a predetermined configuration, an optical means having a reflection surface for reflecting the white light, a field lens for collimating the white light, an array of M×N thin film actuated mirrors for changing the optical path of the white light reflected therefrom, a projection stopper having a projection aperture for passing a predetermined amount of the white light, a relay lens system having a plurality of lenses for modulating the size of the predetermined configuration of the white light, a RGB pixel filter for dividing the white light into the primary light beams, a projection lens for projecting the primary light beams and a projection screen for displaying an image made up of M×N number of pixels thereon. In the optical projection system, the RGB pixel filter is disposed between the projection stopper and the projection lens, and hence the white light only has to pass through the RGB pixel filter once, which will, in turn, prevent the lowering of the intensity of the white light and hence the optical efficiency of the system, and it will also cut down the amount of the white light that is reflected away, thereby reducing noises at the projection screen.

10 Claims, 2 Drawing Sheets

OPTICAL PROJECTION SYSTEM

This is a continuation, of application Ser. No. 08/564,206, filed Oct. 20, 1995 and now U.S. Pat. No. 5,541,679.

FIELD OF THE INVENTION

The present invention relates to an optical projection system; and, more particularly, to an optical projection system having a novel optical baffling means.

BACKGROUND OF THE INVENTION

Among the various video display systems available in the art, an optical projection system is known to be capable of providing high quality images in a large scale.

In FIG. 1, there is presented a schematic view of a prior art optical projection system 10 comprising a non-point white light source 11, a source lens 20, a source stopper 25 provided with a source aperture 26, an optical means 50 having a reflection surface 55, a field lens 60, a RGB pixel filter 40, a projection stopper 35 provided with a projection aperture 36, a projection lens 30, a projection screen 90 and an array 70 of M×N thin film actuated mirrors 71.

In such a system, a white light emanating from the non-point white light source 11 is focused along a first optical light path onto the source stopper 25 by the source lens 20, wherein the white light has a first, a second and a third primary light beams, each of the primary light beams being of one of the primary colors. The source stopper 25 is used for shaping the emanated white light from the non-point white light source 11 after it passes through the source lens 20 into a predetermined configuration by allowing a certain portion of the white light to pass through the source aperture 26 thereof. The transmitted white light from the source stopper 25 having the predetermined configuration travels onto the optical means 50, wherein the reflection surface 55 of the optical means 50 is in a facing relationship with the field lens 60 and the source stopper 25. The reflected white light from the reflection surface 55 of the optical means 50 diverges along a second optical light path and is collimated by the field lens 60, thereby being uniformly projected onto the RGB pixel filter 40, wherein the RGB pixel filter 40 is disposed between the field lens 60 and the array 70 of thin film actuated mirrors 71 and is in a facing relationship with the array 70 of thin film actuated mirrors 71. The RGB pixel filter 40 receives the collimated white light from the field lens 60, divides it into the first, the second and the third primary light beams, and transmits the primary light beams to the array 70 of the thin film actuated mirrors 71. Each of the thin film actuated mirrors 71 in the array 70 has a mirror 76, an actuator 72 and an active matrix 74, wherein the actuator 72 is made of a piezoelectric or an electrostrictive material which deforms in response to an electric signal applied thereto. Each of the thin film actuated mirrors 71 in the array 70 corresponds to one of the pixels to be displayed.

A third optical light path of the primary light beams reflected from each of the thin film actuated mirrors 71 in the array 70 is determined by the amount of deformation of the actuator 72 in each of the thin film actuated mirrors 71 in the array 70.

The primary light beams reflected from each of the thin film actuated mirrors 71 in the array 70 diverge along the third optical light path and are focused back to the projection stopper 35 by the field lens 60 after repassing through the RGB pixel filter 40. As the optical means 50 is not located on the third optical light path of the primary light beams, the primary light beams reflected from each of the thin film actuated mirrors 71 in the array 70 are focused back directly onto the projection stopper 35 by the field lens 60.

The primary light beams reflected from each of the undeflected thin film actuated mirrors 71 in the array 70 are focused back to the projection stopper 35 along the third optical light path by the field lens 60 after repassing through the RGB pixel filter 40 so that the primary light beams do not pass through the projection aperture 36 of the projection stopper 35. However, the primary light beams reflected from each of the deflected thin film actuated mirrors 71 in the array 70 are focused back to the projection stopper 35 along the third optical light path by the field lens 60 after repassing through the RGB pixel filter 40 so that the primary light beams pass through the projection aperture 36 of the projection stopper 35, thereby modulating the intensity of the primary light beams. The primary light beams which pass through the projection aperture 36 of the projection stopper 35 travel to the projection lens 30 which projects the primary light beams transmitted from the projection aperture 36 on the projection screen 90, thereby displaying the image made up of M×N number of the pixels.

There are a number of problems associated with the optical projection system 10 described above. The first and foremost is a noise problem caused by the RGB pixel filter 40 reflecting a certain portion of the reflected white light from the reflection surface 55 of the optical means 50. Since the RGB pixel filter 40 is located directly on the second optical light path between the field lens 60 and the array 70 of the M×N thin film actuated mirrors 71, it may reflect the certain portion of the reflected white light from the reflection surface 55 of the optical means 50, and this will be reflected as the noise at the projection screen 90. Furthermore, repassing of the primary light beams reflected from each of the thin film actuated mirrors 71 in the array 70 through the RGB pixel filter 40 will reduce the intensity of the primary light beams, thereby reducing the overall optical efficiency of the system 10.

SUMMARY OF THE INVENTION

It is, therefore, an object of the present invention to provide an optical projection system capable of preventing an occurrence of noise.

It is another object of the present invention to provide an optical projection system capable of minimizing the loss of optical intensity.

In accordance with one aspect of the present invention, there is provided an optical projection system capable of displaying an image having M×N pixels, wherein M and N are integers, comprising: a non-point white light source for emanating a white light along a first optical light path, wherein the white light has a first, a second and a third primary light beams, each of the primary light beams being of one of the primary colors; an array of M×N thin film actuated mirrors, each of the thin film actuated mirrors having a mirror, an actuator and an active matrix, each of the thin film actuated mirrors in the array being capable of changing the optical path of the reflected white light therefrom; a source stopper, provided with a source aperture having a specific configuration, placed on the first optical light path, for shaping the emanated white light from the non-point white light source into a predetermined configuration; a source lens, disposed between the source stopper and the non-point white light source, for focusing the emanated white light from the non-point white light source onto the source stopper; an optical means, having a reflection surface, for reflecting along a second optical light path the transmitted white light from the source stopper; a field lens, located between the optical means and the array of thin film actuated mirrors, for collimating the reflected white light from the reflection surface of the optical means onto the array of thin film actuated mirrors and for refocusing along a third optical light path the reflected white light from the array of the thin film actuated mirrors; a projection stopper, provided with a projection aperture, and located on the third optical light path, for passing a predetermined amount of the reflected white light from each of the thin film actuated mirrors in the array through the projection aperture thereof, to thereby modulate the intensity of the white light; a relay lens system, provided with a plurality of lenses, for modulating the size of the predetermined configuration of the transmitted white light from the projection stopper; a RGB pixel filter for dividing the white light from the relay lens system into the primary light beams; a projection screen for displaying an image comprised of M×N pixels thereon; and a projection lens for projecting the primary light beams from the RGB pixel filter onto the projection screen, thereby displaying the image of M×N pixels.

BRIEF DESCRIPTION OF THE DRAWINGS

The above and other objects and features of the present invention will become apparent from the following description of the preferred embodiments given in conjunction with the accompanying drawings, wherein.

DETAILED DESCRIPTION OF THE PREFERRED EMBODIMENTS

Figure 1:
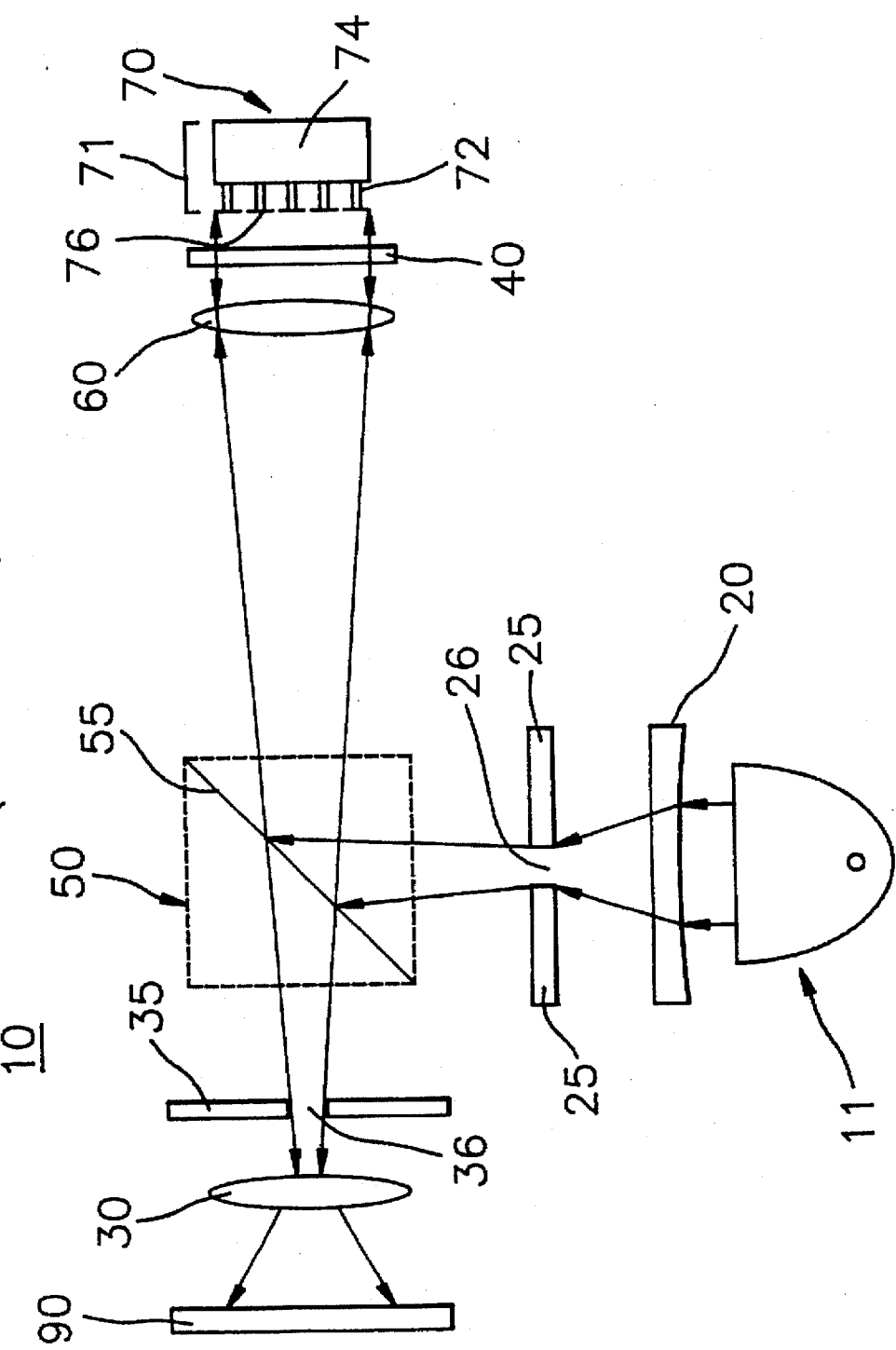
FIG. 1 presents a schematic view of a prior art optical projection system.
Figure 2:
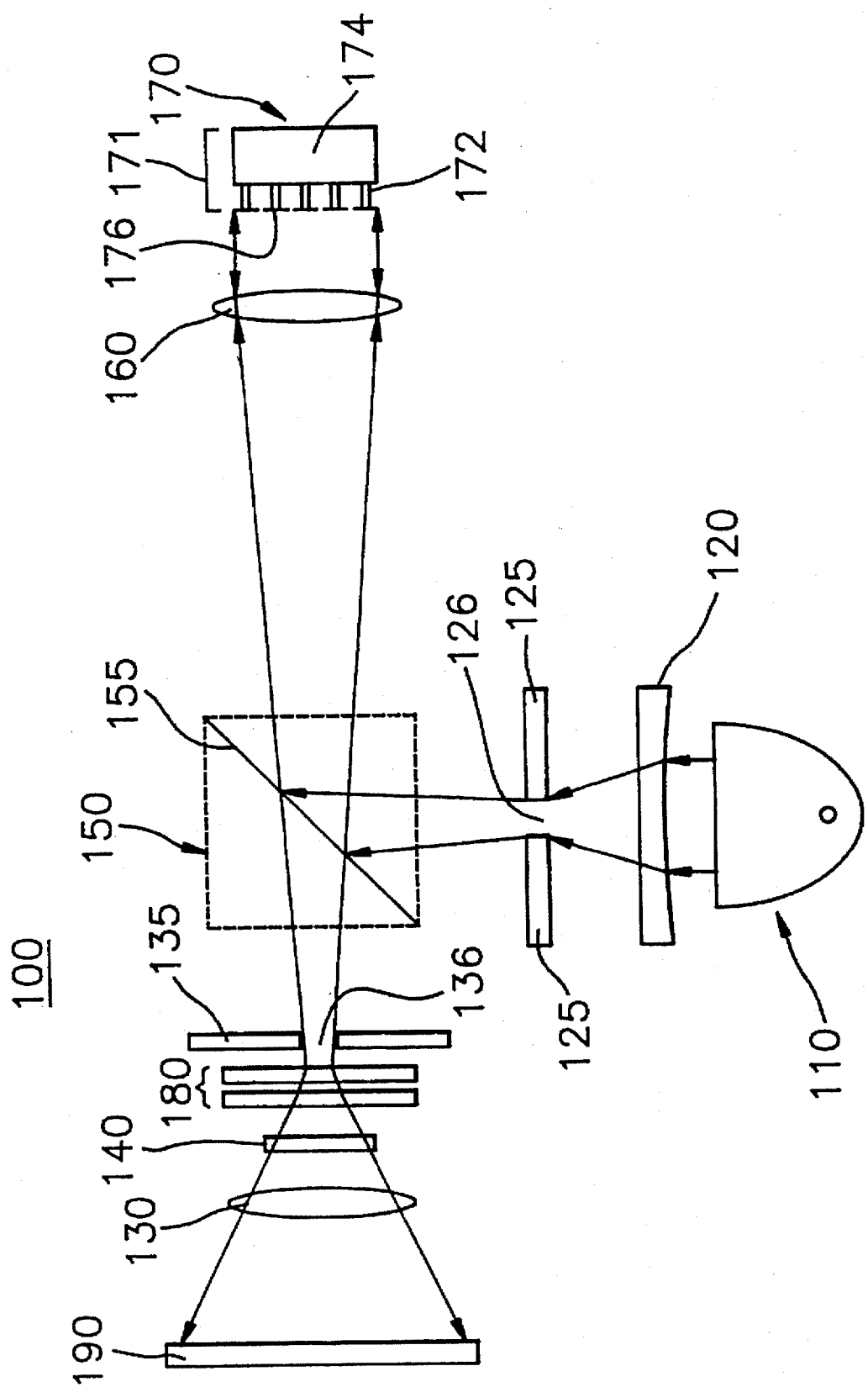
FIG. 2 illustrates a schematic view of an optical projection system in accordance with a preferred embodiment of the present invention.

Referring now to FIG. 2, there is provided a schematic view of an optical projection system 100 in accordance with a preferred embodiment of the present invention.

The inventive optical projection system 100 comprises a non-point white light source 110, a source lens 120, a source stopper 125 provided with a source aperture 126, an optical means 150 having a reflection surface 155, a field lens 160, an array 170 of M×N thin film actuated mirrors 171, a projection stopper 135 provided with a projection aperture 136, a relay lens system 180 provided with a plurality of lenses, a RGB pixel filter 140, a projection lens 130 and a projection screen 190.

In the novel system, a white light emanating from the non-point white light source 110 is focused along a first optical light path to the source aperture 126 of the source stopper 125 by the source lens 120 located between the non-point white light source 110 and the source stopper 125, wherein the white light has a first, a second and a third primary light beams, each of the primary light beams being of one of the primary colors. The source stopper 125 is used for shaping the emanated white light from the non-point white light source 110 after it passes through the source lens 120 into a predetermined configuration by allowing a certain portion of the white light to pass through the source aperture 126 thereof. The transmitted white light from the source stopper 125 having the predetermined configuration travels onto the optical means 150. The reflection surface 155 of the optical means 150 is in a facing relationship with the source stopper 125 and the field lens 160. The reflected white light from the reflection surface 155 of the optical means 150 diverges along a second optical light path and is collimated by the field lens 160, thereby being uniformly projected onto the array 170 of M×N thin film actuated mirrors 171, wherein the field lens 160 is located between the optical means 150 and the array 170 of thin film actuated mirrors 171. Each of the thin film actuated mirrors 171 in the array 170 includes an actuator 172, an active matrix 174 and a mirror 176, wherein the actuator 172 is made of a piezoelectric or an electrostrictive material which deforms in response to an electric signal applied thereto. Each of the thin film actuated mirrors 171 in the array 170 corresponds to one of the pixels to be displayed.

A third optical light path of the reflected white light from each of the thin film actuated mirrors 171 in the array 170 is determined by the amount of deformation of the actuator 172 in each of the thin film actuated mirrors 171 in the array 170.

The reflected white light from each of the thin film actuated mirrors 171 in the array 170 diverges along the third optical light path and is focused back to the projection stopper 135 by the field lens 160. As the optical means 150 is not located on the third optical light path of the white light, the reflected white light from each of the thin film actuated mirrors 171 in the array 170 is focused back directly onto the projection stopper 135 by the field lens 160.

The reflected white light from each of the undeflected thin film actuated mirrors 171 in the array 170 is focused back to the projection stopper 135 along the third optical light path by the field lens 160 so that the white light does not pass through the projection aperture 136 of the projection stopper 135. However, the reflected white light from each of the deflected thin film actuated mirrors 171 in the array 170 is focused back to the projection stopper 135 along the third optical light path by the field lens 160 so that the white light passes through the projection aperture 136 of the projection stopper 135, thereby modulating the intensity of the white light.

The length of the optical path on which the white light travels from the source stopper 125 to each of the thin film actuated mirrors 171 in the array 170 should be identical to that of the optical path on which the white light travels from each of the thin film actuated mirrors 171 in the array 170 to the projection stopper 135. This is accomplished by placing the source and the projection stoppers 125, 135 at the focal point of the field lens 160. In addition, the white light intensity of the optical projection system 100 is at its highest when all of the white light that passed through the source aperture 126 of the source stopper 125 passes through the projection aperture 136 of the projection stopper 135, and this can be accomplished by making the source and the projection apertures 126, 136 of the source and the projection stoppers 125, 135 identical in shape and size.

The white light which passes through the projection aperture 136 of the projection stopper 135 travels to the relay lens system 180 which is provided with a plurality of lenses, e.g., a pair of lenses, and is disposed between the projection stopper 135 and the RGB pixel filter 140, wherein the relay lens system 180 modulates the size of the predetermined configuration of the white light by adjusting the distance between the lenses thereof, to thereby illuminate onto an entire surface of the RGB pixel filter 140 the white light transmitted from the projection stopper 135. The RGB pixel filter 140, being located between the relay lens system 180 and the projection lens 130, receives the white light having a predetermined size and configuration from the relay lens system 180, divides it into the first, the second and the third primary light beams of the white light, and transmits the primary light beams to the projection lens 130 which projects the transmitted primary light beams from the RGB pixel filter 140 on the projection screen 190, thereby displaying the image comprised of M×N pixels.

In contrast with the optical projection system 10 of prior art, in the inventive optical projection system 100, the RGB pixel filter 140 is disposed between the projection stopper 135 and the projection lens 130, and hence the white light only has to pass through the RGB pixel filter 140 once, which will, in turn, prevent the lowering of the intensity of the white light and hence the optical efficiency of the system, and it will also cut down the amount of the white light that is reflected away, thereby reducing the occurrence of noises at the projection screen 190.

While the present invention has been described with respect to certain preferred embodiments only, other modifications and variations may be made without departing from the scope of the present invention as set forth in the following claims.

What is claimed is:

1. An optical projection system capable of displaying an image having pixels on a projection screen comprising:

means for emanating a white light, wherein the white light has a first, a second and a third primary light beams, each of the primary light beams being of one of the primary colors;

an array of thin film actuated mirrors, each of the thin film actuated mirrors in the array being capable of reflecting the white light and changing an optical path of the reflected white light therefrom;

a projection stopper, provided with a projection aperture, for passing a fraction of the reflected white light from each of the thin film actuated mirrors in the array through the projection aperture thereof, to thereby modulate the intensity of the reflected white light;

an RGB pixel filter for dividing the white light passing through the projection stopper into the primary light beams; and a projection lens for projecting the primary light beams from the RGB pixel filter on the projection screen.

2. The optical projection system of claim 1, wherein the white light from the emanating means has a predetermined configuration.

3. The optical projection system of claim 1, further comprising a field lens which is used for colliminating the white light from the emanating means onto the array of thin film actuated mirrors and for focusing the reflected white light from each of the thin film actuated mirrors onto the projection stopper.

4. The optical projection system of claim 1, wherein the fraction of the reflected white light passing through the projection stopper is determined by the optical path thereof.

5. The optical projection system of claim 1, further comprising a relay lens system disposed between the projection stopper and the RGB pixel filter.

6. The optical projection system of claim 5, wherein the relay lens system is provided with a plurality of lenses.

7. The optical system of claim 3, further comprising a source stopper, provided with a source aperture, for passing a fraction of the white light from the emanating means to the field lens.

8. The optical projection of claim 7, wherein the source stopper and the projection stopper are positioned at the focal point of the field lens.

9. An optical projection system capable of displaying an image having pixels on a projection screen comprising:

means for emanating a white light, wherein the white light has a first, a second and a third primary light beams, each of the primary light beams being of one of the primary colors;

a source stopper, provided with a source aperture, for shaping the white light from said means emanating into a predetermined configuration;

an array of actuated mirrors type optical path changing means, each of the actuated mirrors in the array being capable of reflecting the white light and changing an optical path of the reflected white light therefrom;

a field lens for collimating the white light from said source stopper and for focusing the reflected white light from each of the actuated mirrors in the array;

a projection stopper, provided with a projection aperture, for passing a fraction of the reflected white light from each of the actuated mirrors in the array through the projection aperture thereof, to thereby modulate the intensity of the reflected white light;

a RGB pixel filter for dividing the white light passing through the projection stopper into the primary light beams; and a projection lens for projecting the primary light beams from the RGB pixel filter on the projection screen, wherein said source and projection stoppers are placed at the focal point of said field lens.

10. An optical projection system capable of displaying an image having pixels on a projection screen comprising:

a first optical light path, having means for emanating a white light, wherein the white light has a first, a second and a third primary light beams, each of the primary light beams being of one of the primary colors, a source stopper, provided with a source aperture, for shaping the white light from said emanating means into a predetermined configuration, and an array of actuated mirrors type optical path changing means, each of the actuated mirrors in the array being capable of reflecting the white light and changing an optical path of the reflected white light therefrom; and a second optical light path, having a projection stopper, provided with a projection aperture, for passing a predetermined amount of the reflected light from said optical path changing means to modulate the intensity of the white light, a RGB pixel filter for dividing the white light passing through the projection stopper into the primary light beams, a projection lens for projecting the primary light beams from the pixel filter onto the projection screen.

* * * * *